May 18, 1965  H. A. TRENCHARD  3,183,603
CONVERSION APPARATUS AND METHOD FOR MAGNETIC COMPASS SYSTEMS
Filed June 25, 1962  4 Sheets-Sheet 1

INVENTOR.
HERBERT A. TRENCHARD
BY
ATTORNEY

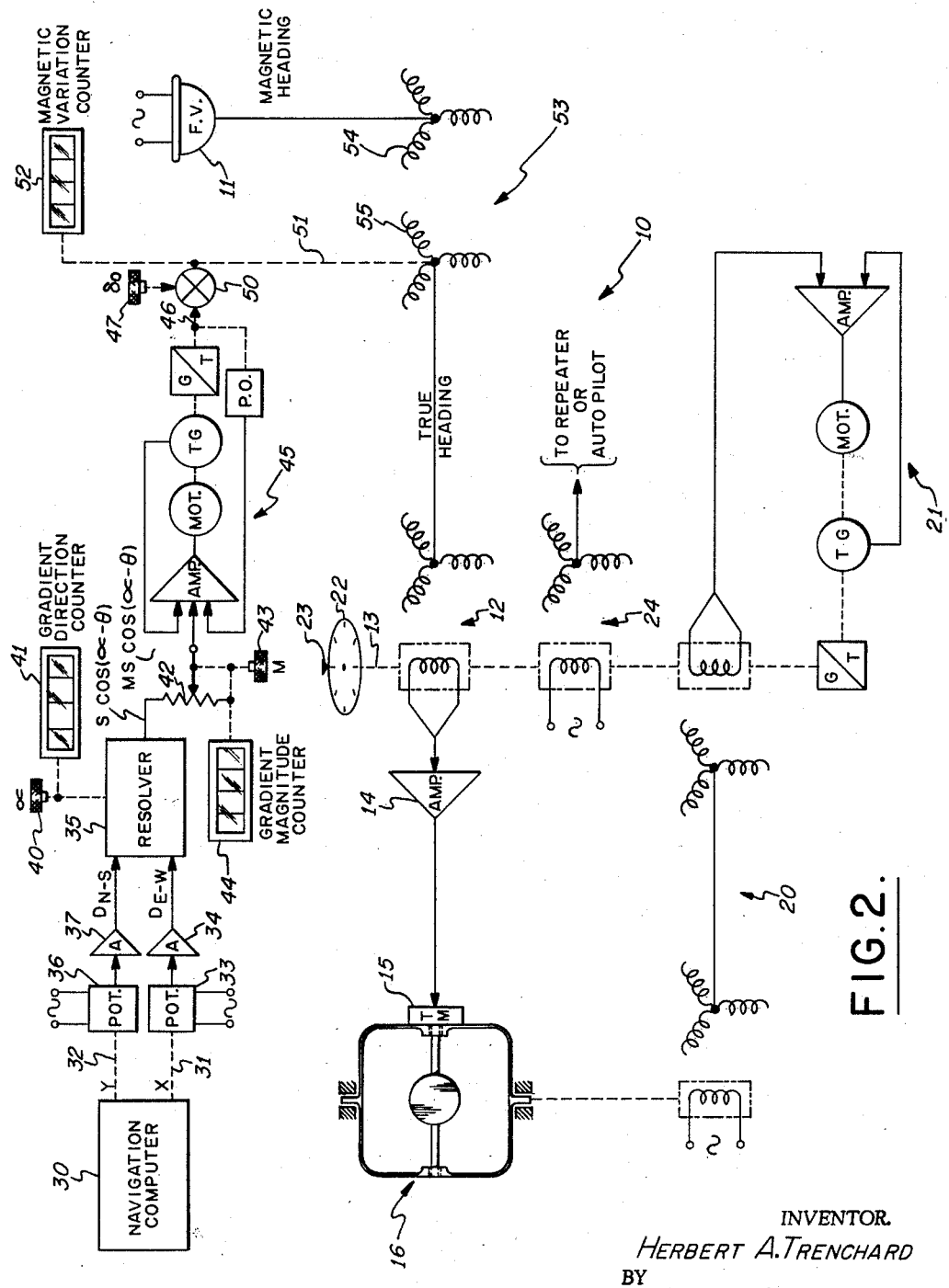

FLIGHT FROM NEW YORK TO ARGENTIA

| CHART VALUES | | FIRST APPROXIMATION | | | | SECOND APPROXIMATION | | |
|---|---|---|---|---|---|---|---|---|
| DISTANCE (N M) | GRIVATION (DEGREES) | COMPUTED GRIVATION | ERROR (DEGREES) | CROSS-TRACK ERROR (N M) | | COMPUTED GRIVATION | ERROR (DEGREES) | CROSS-TRACK ERROR (N M) |
| 0 | 44.0 | 44.0 | 0 | – | | 42.9 | -1.1 | – |
| 50 | 42.2 | 42.3 | 0.1 | 0.04 | | 41.2 | -1.0 | -0.92 |
| 100 | 40.4 | 40.6 | 0.2 | 0.17 | | 39.5 | -0.9 | -1.75 |
| 150 | 38.2 | 38.9 | 0.7 | 0.56 | | 37.8 | -0.4 | -2.32 |
| 200 | 36.1 | 37.3 | 1.2 | 1.39 | | 36.2 | 0.1 | -2.45 |
| 250 | 34.0 | 35.6 | 1.6 | 2.61 | | 34.5 | 0.5 | -2.19 |
| 300 | 32.5 | 33.9 | 1.4 | 3.92 | | 32.8 | 0.3 | -1.84 |
| 350 | 30.6 | 32.2 | 1.6 | 5.23 | | 31.1 | 0.5 | -1.49 |
| 400 | 29.0 | 30.5 | 1.5 | 6.58 | | 29.4 | 0.4 | -1.10 |
| 450 | 27.4 | 28.8 | 1.4 | 7.84 | | 27.7 | 0.3 | -0.79 |
| 500 | 25.6 | 27.2 | 1.6 | 9.15 | | 26.1 | 0.5 | -0.44 |
| 550 | 23.9 | 25.5 | 1.6 | 10.55 | | 24.4 | 0.5 | 0 |
| 600 | 22.1 | 23.8 | 1.7 | 11.99 | | 22.7 | 0.6 | 0.48 |
| 650 | 20.5 | 22.1 | 1.6 | 13.43 | | 21.0 | 0.5 | 0.96 |
| 700 | 18.8 | 20.4 | 1.6 | 14.83 | | 19.3 | 0.5 | 1.40 |
| 750 | 17.5 | 18.8 | 1.3 | 16.09 | | 17.7 | 0.2 | 1.71 |
| 800 | 16.0 | 17.1 | 1.1 | 17.14 | | 16.0 | 0 | 1.80 |
| 850 | 14.5 | 15.4 | 0.9 | 17.91 | | 14.3 | -0.2 | 1.71 |
| 900 | 13.3 | 13.7 | 0.4 | 18.58 | | 12.6 | -0.7 | 1.32 |
| 950 | 12.0 | 12.0 | 0 | 18.75 | | 10.9 | -1.1 | 0.53 |

$$\text{GRADIENT} = \frac{-32}{950} = -3.37°/100\,\text{n m}$$

$$\text{CORRECTION} = \frac{18.75}{950} \times 57.3 = 1.1°$$

FIG. 5.

United States Patent Office 3,183,603
Patented May 18, 1965

3,183,603
CONVERSION APPARATUS AND METHOD FOR
MAGNETIC COMPASS SYSTEMS
Herbert A. Trenchard, Hyattsville, Md., assignor to Sperry Rand Corporation, Great Neck, N.Y., a corporation of Delaware
Filed June 25, 1962, Ser. No. 205,004
8 Claims. (Cl. 33—224)

This invention relates to conversion apparatus and method for magnetic compass systems for converting the magnetic heading signal obtained from a magnetic compass system to the present heading of the craft with respect to a predetermined coordinate system other than magnetic.

In certain systems it is desirable, for example, to convert the magnetic heading of a craft to true heading. In a region where the magnetic variation, i.e., declination, does not change appreciably over the flight path, e.g., a North-South flight in the middle of the United States, the declination changes can be set into the compass system by a manual adjustment every 200 nautical miles or thereabout. However, in high latitudes and along a maximum declination gradient, the declination changes are so large and so rapid as to require many manual adjustments during a flight. This, of course, detracts from the usefulness of the magnetic compass system and it is desirable to automatically correct for the declination changes.

Previous approaches have involved the use of three-dimensional cams and/or clock motor devices. The cams are inferior since it is difficult to obtain sufficient detail in the cam and still retain accurate operation over widespread areas. The clock motor units do not take into account variations in course or speed.

Therefore, it is a primary object of the present invention to provide conversion apparatus for magnetic compass systems for converting the magnetic heading of the craft from a signal representative of the magnetic heading of the craft to a signal representative of the present heading of the craft with respect to a predetermined coordinate system.

It is an additional object of the present invention to provide conversion apparatus for magnetic compass systems which requires a minimum of manual manipulations.

The above objects are accomplished by the present invention with respect to geographical coordinates, for example, by means responsive to the distance traveled by the craft from a predetermined initial position which provides a signal representative of the distance traveled by the craft in the direction of maximum change of magnetic variation or declination. This signal is multiplied by a signal representative of the maximum rate of change of magnetic variation with respect to distance to provide a signal representative of the change in magnetic variation over the distance traveled by the aircraft. This signal is added to the initial magnetic variation to provide a signal representative of the magnetic variation at the present position of the craft which is utilized to correct the magnetic heading signal from the magnetic compass system to provide a composite signal representative of the true heading of the craft.

Referring to the drawings,

FIG. 2 is a schematic diagram of a conversion apparatus for magnetic compass systems incorporating the present invention;

FIG. 5 are charts used in conjunction with a portion of the flight shown in FIG. 4.

Figure 1:
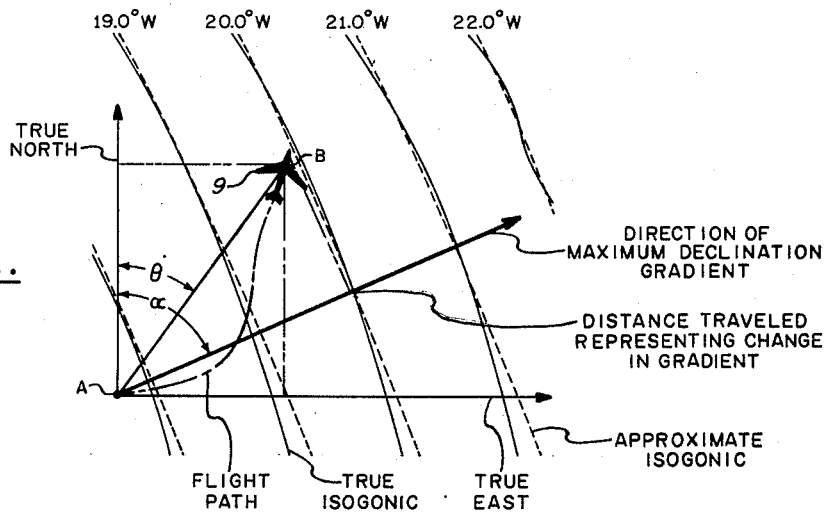
FIG. 1 is a diagram illustrating the course and heading of an aircraft on a typical flight with respect to true isogonic and linearized isogonic lines.

Referring now to FIG. 1, an aircraft is shown having flown from a position A to a position B along an irregular flight path. As shown, the true isogonic lines are nearly straight and almost parallel to one another. The true isogonic lines can be linearized to provide approximate isogonic lines that are straight, parallel equally spaced lines. This can be done by approximating each isogonic and averaging the spacings and angles which result. Hence, for any direction of flight from position A the rate of change of declination with distance from A is assumed to be approximately constant.

Under these assumptions there is a given geographic heading $\alpha$ along which the rate of change of declination with distance D from A is a maximum. The direction of maximum declination gradient is perpendicular to the linearized isogonics. The declination gradient M is computed from the spacing of the linearized isogonic along the direction of the maximum declination gradient. The declination $\delta$ is obtained by the equation $\delta = \delta_0 + MD$ where $\delta_0$ is the declination measure at position A.

Assume that after a certain time the aircraft has flown from A to B; the path flown between A and B by the aircraft is unimportant. It is necessary, however, that the location of B relative to A be known; for example, by means of a navigation computer, in terms of X and Y distances where Y is the true North-South component of the distance S between A and B and X is the true East-West component of the distance S. By algebra the declination change $\delta - \delta_0$ can be written as follows:

$$\delta - \delta_0 = M(X^2 + Y^2)^{\frac{1}{2}} \cos(\alpha - \theta)$$

where $$\theta = \tan^{-1}\frac{X}{Y}$$

$\alpha$ is the geographic heading along which the declination gradient is a maximum, and M is the rate of change of declination with distance along the path of maximum declination gradient.

The term "gradient" as used in this specification is defined as the vector of maximum rate of change which in the case of geographic coordinates represents the maximum rate of change of declination, i.e., magnetic variation, and in the case of grid coordinates represents the maximum rate of change of magnetic variation and meridian convergence. The invention will be described with respect to conversion from magnetic to geographic coordinates with respect to the embodiment of FIG. 2 and for conversion from magnetic to grid coordinates with respect to FIG. 3.

Referring now to FIG. 2, a gyro magnetic compass system 10 which may be of the type disclosed in U.S. Patent No. 2,898,690 of W. P. Colistra, entitled "Quick Setting Means for Gyro Magnetic Compass," issued August 11, 1959, is shown having a magnetic compass in the form of a flux valve 11. The flux valve 11 is responsive to the earth's magnetic field and provides a signal representative of the magnetic heading of the aircraft 9 (shown in FIG. 1) upon which it is mounted. In the absence of the present invention, the flux valve 11 is usually connected so that the magnetic heading signal energizes the stator of synchro control transformer 12 which has its rotor mounted on a heading shaft 13. Any error between the position of the earth's magnetic field as sensed by the flux valve 11 and the position of the heading shaft 13 generates an error signal in the synchro 12 which is amplified in an amplifier 14. The amplified error signal energizes a torque motor 15 which exerts a torque about the horizontal axis of a directional gyroscope 16 thereby slaving the gyroscope 16 to the magnetic meridian. The position of the heading shaft 13 is controlled from the slaved gyroscope 16 by means of a synchro data transmission system 20 and a servo system 21 in a conventional manner more fully described in said Patent No. 2,898,690.

The heading shaft 13 has a compass card 22 mounted thereon for providing an indication of the heading of the craft with respect to a lubber line 23. Also mounted on the heading shaft 13 is a synchro transmitter 24 adapted to actuate a repeater compass and/or to provide a heading signal to an autopilot as indicated by the legend. With the compass system 10 described above, it will be realized that the position of the heading shaft 13 is representative of the heading of the craft with respect to the magnetic North, i.e., magnetic heading.

To obtain the heading of the craft with respect to a different coordinate system, e.g. true North, involves the addition of magnetic variation to the magnetic heading signal to thereby provide true heading, i.e., the heading of the craft with respect to true or geographical North.

Continuing to refer to FIG. 2, a navigation computer 30 is responsive to the movements of the aircraft 9 as shown in FIG. 1. An output shaft 31 of the navigation computer 30 provides a shaft rotation X representative of the X component of the distance S traveled by the aircraft 9 going from point A to B in the direction of true East. Similarly, an output shaft 32 provides a shaft rotation Y representative of the Y component of the distance S in the direction of true North. The shaft 31 is connected to position the slider of a potentiometer 33 to provide an electrical signal representative of the X component of the distance traveled in the East-West direction. The signal from the potentiometer 33 is amplified in an amplifier 34 and applied to one stator winding of a resolver 35.

The shaft 32 is connected to position the slider of a potentiometer 36 to provide an electrical signal representative of the Y component of the distance traveled in the North-South direction. The signal from the potentiometer 36 is amplified in amplifier 37 and applied to a quadrature stator winding of the resolver 35. The rotor winding of the resolver 35 is manually rotated by means of a knob 40 to a position representative of the gradient direction $\alpha$. The gradient direction $\alpha$ may be read on the counter 41 connected to the knob 40. The resolver 35 is connected to a potentiometer 42. The output signal from the resolver 35 is representative of $S \cos(\alpha - \theta)$ and energizes the potentiometer 42 accordingly. The slider of the potentiometer 42 is manually positioned in accordance with the gradient magnitude M by means of a knob 43. The gradient magnitude M may be read on a counter 44 connected to the knob 43. The output of the potentiometer 42 is, therefore, a signal representative of $MS \cos(\alpha - \theta)$ which, as explained above, is representative of the declination change $\delta - \delta_0$ from position A to position B of the aircraft.

This signal is applied to a displacement servo loop 45 to provide a rotation of its output shaft 46 representative of the change in declination $\delta - \delta_0$. The servo loop 45 includes a position or displacement feedback from a pick-off labeled P.O. and a rate feedback for damping from a tachometer generator labeled TG. The initial declination $\delta_0$ at the position A of the aircraft is inserted by manual rotation of a knob 47 which is connected to rotate one input gear of a differential gear 50. The other input gear of the differential 50 is rotated by the shaft 46 so that the output shaft 51 from the differential 50 is rotated in accordance with the initial declination plus the change in declination to provide the declination at the position B of the aircraft. The declination may be read on a counter 52 which is connected to the output shaft 51.

A synchro differential 53 is interposed between the flux valve 11 and the control transformer 12 of the compass system 10. The stator 54 of the differential synchro 53 is connected to the flux valve 11 and is responsive to the magnetic heading sensed thereby. The rotor 55 of the differential synchro 53 is connected to the shaft 51 and rotated in accordance with the declination at the position B. The output signal from the differential synchro 53 is therefore representative of the magnetic heading plus the declination at the position B, i.e., true heading. Accordingly, the heading shaft 13 is rotated to a position representative of the true heading and provides a signal representative thereof on the indicator 22 and the synchro transmitter 24.

Figure 3:
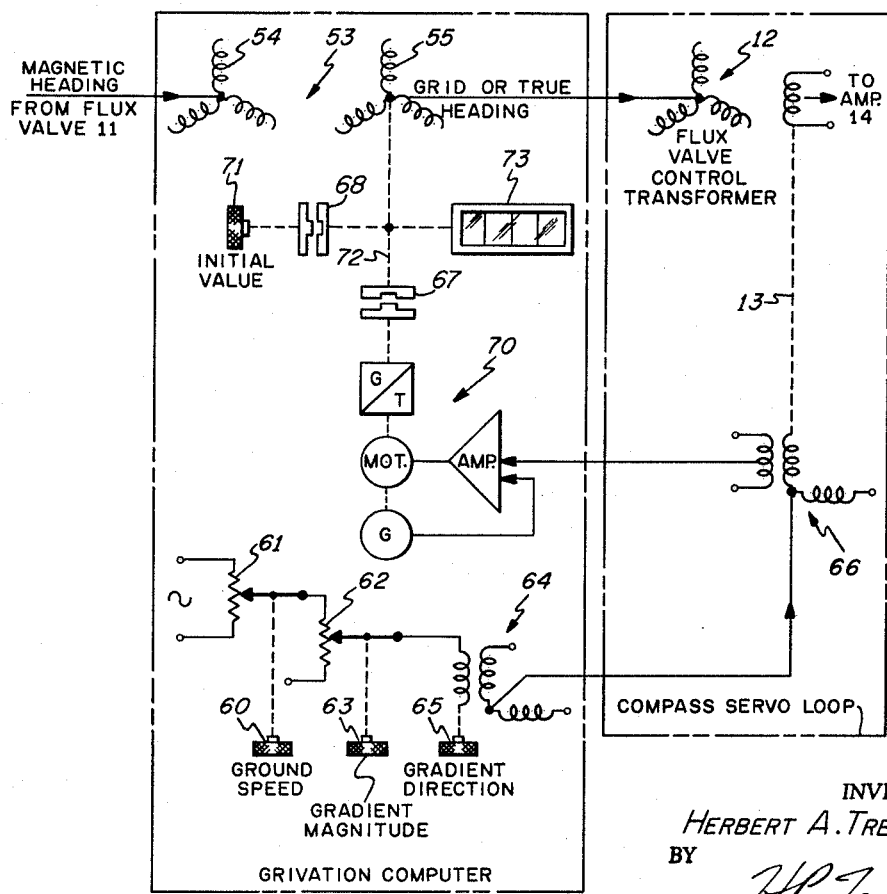
FIG. 3 is a schematic diagram of an additional embodiment of a conversion apparatus for magnetic compass systems incorporating the present invention.

Referring now to FIG. 3, the present invention will be described with respect to conversion apparatus for converting from a magnetic coordinate system to a grid coordinate system. Identical elements with respect to FIG. 2 are indicated by identical reference characters. A signal representative of the ground speed of the aircraft is manually inserted by rotation of a knob 60 to position the slider of a potentiometer 61 which is energized to provide an A.C. electrical signal representative of the ground speed. The slider of the potentiometer 61 is connected to the resistive winding of another potentiometer 62 which has its slider positioned by means of a knob 63 in accordance with the magnitude of the grivation gradient where the grivation is defined as the sum of magnetic variation and meridian convergence. The slider of the potentiometer 62 in turn is connected to the rotor of a resolver 64 whose manual input by means of the knob 65 is representative of the direction relative to the grid of the maximum gradient. The stator windings of the resolver 64 are connected to the windings of another resolver 66 mounted for rotation with the heading shaft 13 of the compass system 10.

The resultant signal from the resolver 66 is representative of the magnitude of the grivation gradient times the component of velocity along the line of maximum gradient. This resultant signal is fed to a rate servo 70 which integrates the resultant signal to provide a shaft rotation representative of the change in grivation from point A to point B. The initial value of the grivation at point A is inserted by means of a knob 71 connected to the output shaft 72 of the rate servo 70. The grivation may be read on a counter 73. Clutches 67 and 68 are provided to permit insertion of the initial value of the grivation by disengaging clutch 67 and to prevent accidental manipulation of the knob 71 by disengaging clutch 68 after the initial value has been inserted. The output shaft 72 is connected to rotate the rotor of the differential synchro 53 in accordance with the initial value of the grivation plus the change in grivation from point A to B. Thus, continuous correction of the grivation signal during flight is provided and the heading shaft 13 is rotated to a position representative of the grid heading in a manner similar to that described with respect to FIG. 2.

Figure 4:
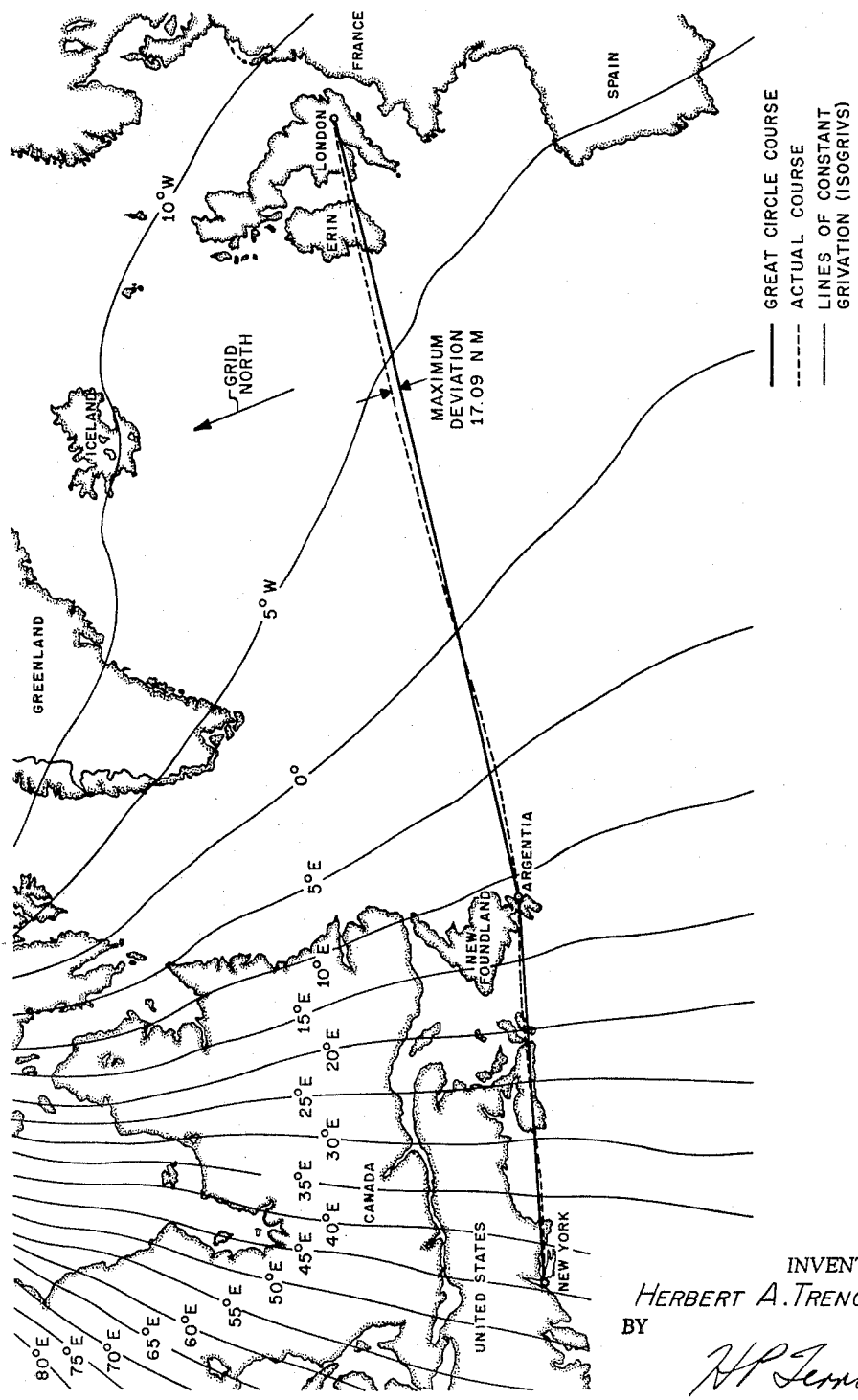
FIG. 4 is a route map showing a typical flight of an aircraft.

To illustrate further the operation of the grivation conversion apparatus of FIG. 3, a flight from New York to London via Argentia is shown in FIG. 4 and analyzed in part in FIG. 5. A solid, straight line is drawn on the chart to represent the great circle course from New York to Argentia and then Argentia to London. FIG. 5 lists the actual grivation angle, read from the chart at 50 nautical-mile intervals for the first leg of the journey. The gradient is determined by subtracting the value at the beginning from the value at the end of the leg of the flight and dividing by the distance traveled. In this case, the gradient along the direction of flight is minus 3.37 degrees per hundred nautical miles. The gradient set into the potentiometer 62 is the rate of change along the direction of maximum change. To find this direction, it is convenient to measure the average direction which the lines of no change, the isogrivs, make to our proposed flight path by statistically averaging each isogriv individually and then averaging the spacing and angles which result. Doing this yields an angle of 93 degrees for the course from New York to Argentia. This course is at a grid heading of 113 degrees. Thus, the isogrivs make an average angle to grid North of twenty degrees and the line of maximum change, considering an Easterly angular movement of the magnetic field with respect to grid as positive, is along the grid heading of 290 degrees. This is the heading set into the resolver 64 by rotating the gradient direction knob 65. The gradient is the gradient along the flight path divided by the cosine of the angle between the flight path and the line of maximum change, or the cosine of 173 degrees, in this case. This yields a gradient magnitude of 3.40 degrees per hundred nautical miles. The gradient along the flight path is used to compute the setting to yield maximum accuracy along the intended course. It is necessary to use the direction of maximum change, however, so that the apparatus will compute accurate grivation changes even through the aircraft has deviated from the intended course to seek out favorable winds or to avoid a storm center.

FIG. 5 shows the values of grivation, the angular error, and the deviation from course that will result from using the values of gradient discussed and setting in the initial value from the charts. It can be seen that the error is always positive and that Argentia would be missed by 18.75 nautical miles. The average angular error is the angle whose tangent is 18.75 divided by the length of the flight, 950 nautical miles. This angle is 1.1 degrees and can be subtracted from the initial setting to correct for the estimated error of closure. The result is the deviations from course given in the last column with an initial setting of 42.9 degrees instead of chart value of 44 degrees. The miss distance at Argentia will be only .53 mile and the greatest deviation from course will be 2.45 miles. This deviation and the deviation from the second leg from Argentia to London are plotted on the chart in FIG. 4. The maximum deviation over the 3,000-mile flight is 17.09 miles and the error of closure at London is .44 mile. The minor deviations from course are small enough to cause no significant increase in distance traveled.

The course indicated used the data from the charts as a source of information on determining the coefficients to be inserted into the grivation conversion apparatus. The chart inaccuracies are, of course, present in these calculations. However, in actual operation repeated trips over the same course made by aircraft using this system offer a means of eliminating chart errors. For example, if Argentia is consistently missed to the South, a slightly higher initial setting is required, while if consistently missed to the North, a lower setting is needed. Thus, experience can be used to improve the chart data and make the crosstrack error shown in FIG. 4 the true measure of the accuracy of this approximate calculation. Thus, great circle flights can be made consistently with high accuracy over long distance using the present invention. In the cited example, only two sets of predetermined values are easily inserted into the grivation conversion apparatus for a three-thousand mile fight and the resulting error at the end of this flight is less than one-half mile.

In order to obtain a true operational picture of the present invention, one additional source of error should be considered. This is variation of the earth's magnetic field with time. The long-term changes, such as secular variation, can be corrected by experience, but short variations such as the solar diurnal variation will introduce some error. These variations, however, seldom exceed one-half degree and are for the most part predictable. Thus, they will only degrade the accuracy by one-half degree maximum.

Many alternative embodiments of the present invention are possible, for example, grivation conversion apparatus may be used in conjunction with a Doppler navigator. The along-track computed distance output of the Doppler navigator is multiplied by the along-track gradient to compute grivation.

While the invention has been described in its preferred embodiments, it is to be understood that the words which have been used are words of description rather than of limitation and changes within the purview of the appended claims may be made without departing from the true scope and spirit of the invention in its broader aspects.

1. Conversion apparatus for magnetic compass systems for navigable craft comprising:
   (1) means responsive to the earth's magnetic field for providing a signal representative of the magnetic heading of said craft,
   (2) means for providing a signal representative of the deviation of the magnetic heading from the actual heading of the craft with respect to a predetermined coordinate system at a predetermined position of said craft,
   (3) means for establishing a reference representative of the direction of the gradient with respect to distance of the earth's magnetic variation,
   (4) means responsive to the movement of said craft from said predetermined position and to said gradient direction reference for providing a signal representative of the component of the distance traveled by said craft in the direction of said reference,
   (5) means for providing a signal representative of the magnitude of said gradient,
   (6) and means responsive to all of said signals for providing a composite signal representative of the present heading of the craft with respect to said predetermined coordinate system.

2. Conversion apparatus for magnetic compass systems for navigable craft comprising:
   (1) means responsive to the earth's magnetic field for providing a signal representative of the magnetic heading of said craft,
   (2) means for providing a signal representative of the magnetic variation at a predetermined position of said craft,
   (3) means for establishing a reference representative of the direction of the gradient with respect to distance of the earth's magnetic variation,
   (4) means responsive to the distance traveled by said craft from said predetermined position and to said gradient direction reference for providing a signal representative of the component of the distance traveled by said craft in the direction of said reference,
   (5) means for providing a signal representative of the magnitude of said gradient,
   (6) means responsive to all of said signals for providing a composite signal representative of the present heading of the craft corrected for magnetic variation at the present position of said craft.

3. Conversion apparatus for magnetic compass systems for navigable craft comprising:
   (1) means responsive to the earth's magnetic field for providing a first signal representative of the magnetic heading of said craft,
   (2) means for providing a second signal representative of the magnetic variation at a predetermined initial position of said craft,
   (3) means for establishing a reference representative of the direction of the gradient with respect to distance of the earth's magnetic variation,
   (4) means responsive to the distance traveled by said craft from said predetermined initial position and to said gradient direction reference for providing a third signal representative of the component of the distance traveled by said craft in the direction of maximum rate of change of linearized magnetic variation,
   (5) means for providing a fourth signal representative of the magnitude of said gradient,
   (6) means responsive to said third and fourth signals for providing a fifth signal representative of the third signal multiplied by the fourth signal that is representative of the change in magnetic variation from said predetermined initial position to a present position, (7) and means responsive to said first, second, and fifth signals for providing a composite signal representative of the true heading of said craft at its present position.

4. Conversion apparatus for magnetic compass systems for navigable craft comprising:

(1) means responsive to the earth's magnetic field for providing a signal representative of the magnetic heading of said craft, (2) means for providing a signal representative of the magnetic variation and meridian convergence with respect to a predetermined coordinate system at a predetermined position of said craft, (3) means for establishing a reference representative of the direction of the gradient with respect to distance of the earth's magnetic variation and meridian convergence, (4) means responsive to the movement of said craft from said predetermined position and to said gradient direction reference for providing a signal representative of the component of the distance traveled by said craft in the direction of maximum rate of change of said magnetic variation and meridian convergence, (5) means for providing a signal representative of the magnitude of said gradient, (6) and means responsive to all of said signals for providing a composite signal representative of the present heading of the craft wtih respect to said predetermined coordinate system corrected for magnetic variation and meridian convergence at the present position of said craft.

5. Conversion apparatus for magnetic compass systems for navigable craft comprising:

(1) means responsive to the earth's magnetic field for providing a first signal representative of the magnetic heading of said craft, (2) means for providing a second signal representative of the magnetic variation and meridian convergence at a predetermined initial position of said craft with respect to a predetermined coordinate system, (3) means for establishing a reference representative of the direction of the gradient with respect to distance of the earth's magnetic variation and meridian convergence, (4) means responsive to the distance traveled by said craft from said predetermined initial position and to said gradient direction reference for providing a third signal representative of the component of the distance traveled by said craft in the direction of maximum rate of change of linearized magnetic variation and meridian convergence, (5) means for providing a fourth signal representative of the maximum rate of change of magnetic variation and meridian convergence with respect to distance, (6) means responsive to said third and fourth signals for providing a fifth signal representative of the third signal multiplied by the fourth signal that is representative of the change in magnetic variation and meridian convergence from said predetermined initial position to a present position, (7) and means responsive to said first, second and fifth signals for providing a composite signal representative of the actual heading of said craft at its present position with respect to said predetermined coordinate system.

6. A method of converting the magnetic heading signal from a magnetic compass system to the present heading of a craft with respect to a predetermined coordinate system including the steps of:

(1) providing the direction of the gradient with respect to distance of the earth's magnetic variation, (2) providing a first signal representative of the component of the distance traveled by said craft in the direction of said gradient, (3) providing a second signal representative of the magnitude of said gradient with respect to distance, (4) multiplying said first and second signals to provide a third signal representative of the change in variation associated with the distance traveled by said craft, and (5) combining said third signal with signals representative of the initial variation and the present magnetic heading to provide a composite signal representative of the present heading of the craft with respect to said predetermined coordinate system.

7. A method of converting the magnetic heading signal from a magnetic compass system to the present heading of a craft with respect to true North including the steps of:

(1) providing the direction of the gradient with respect to distance of the magnetic variation, (2) providing a first signal representative of the component of the distance traveled by said craft in the direction of said gradient, (3) providing a second signal representative of the magnitude of said gradient with respect to distance, (4) multiplying said first and second signals to provide a third signal representative of the change in variation associated with the distance traveled by said craft, and (5) combining said third signal with signals representative of the initial magnetic variation and the present magnetic heading to provide a composite signal representative of the true heading of the craft.

8. A method of converting the magnetic heading signal from a magnetic compass system to the present heading of a craft with respect to a predetermined grid coordinate system including the steps of:

(1) providing the direction of the gradient with respect to distance of the magnetic variation and meridian convergence of said grid coordinate system, (2) providing a first signal represenatative of the component of the distance traveled by said craft in the direction of said gradient, (3) providing a second signal representative of the magnitude of said gradient with respect to distance, (4) multiplying said first and second signals to provide a third signal representative of the change in gradient associated with the distance traveled by said craft, and (5) combining said third signal with signals representative of the initial magnetic variation and meridian convergence and the present magnetic heading to provide a composite signal representative of the heading of the craft with respect to said grid coordinate system.

References Cited by the Examiner

UNITED STATES PATENTS

| | | | |
|---|---|---|---|
| 2,555,328 | 6/51 | Esval et al. | 33—204 |
| 2,882,602 | 4/59 | Gray et al. | 33—224 X |
| 3,024,996 | 3/62 | D'Amico | 235—61 |
| 3,062,437 | 11/62 | Wright | 235—61 |

ROBERT B. HULL, *Primary Examiner.*